United States Patent
Iwamoto

(10) Patent No.: US 8,749,466 B2
(45) Date of Patent: Jun. 10, 2014

(54) VERTICAL ALIGNMENT TYPE LIQUID CRYSTAL DISPLAY APPARATUS HAVING IMPROVED DISPLAY UNIFORMITY

(75) Inventor: Yoshihisa Iwamoto, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 1110 days.

(21) Appl. No.: 12/114,115

(22) Filed: May 2, 2008

(65) Prior Publication Data

US 2008/0278643 A1 Nov. 13, 2008

(30) Foreign Application Priority Data

May 10, 2007 (JP) .................................. 2007-125596

(51) Int. Cl.
*G09G 3/36* (2006.01)
*G09G 5/00* (2006.01)
*G06F 3/038* (2013.01)
*G02F 1/1333* (2006.01)
*G02F 1/1337* (2006.01)

(52) U.S. Cl.
USPC ................. 345/94; 345/87; 345/208; 349/94; 349/123

(58) Field of Classification Search
None
See application file for complete search history.

(56) References Cited

U.S. PATENT DOCUMENTS

| | | | | |
|---|---|---|---|---|
| 4,121,203 A | * | 10/1978 | Edwards et al. | ................. 345/54 |
| 5,136,407 A | | 8/1992 | Clerc | |
| 5,262,881 A | | 11/1993 | Kuwata et al. | |
| 2002/0159014 A1 | * | 10/2002 | Tasaka et al. | ................. 349/124 |
| 2002/0175887 A1 | | 11/2002 | Yamazaki | |
| 2006/0066791 A1 | * | 3/2006 | Mizusako et al. | ............. 349/123 |
| 2006/0114394 A1 | * | 6/2006 | Yamzaki | ......................... 349/139 |
| 2006/0158413 A1 | | 7/2006 | Morita | |
| 2006/0221031 A1 | * | 10/2006 | Chang et al. | ..................... 345/89 |
| 2006/0244895 A1 | * | 11/2006 | Yoshihara et al. | ............. 349/172 |
| 2008/0043188 A1 | * | 2/2008 | Zhu et al. | ....................... 349/114 |

FOREIGN PATENT DOCUMENTS

| | | |
|---|---|---|
| JP | 3-259121 A | 11/1991 |
| JP | 3119737 B2 | 10/2000 |
| JP | 2005-234254 A | 9/2005 |
| JP | 3834304 B2 | 7/2006 |
| JP | 2006-201498 A | 8/2006 |
| WO | 99/40561 A1 | 8/1999 |

OTHER PUBLICATIONS

T. Sugiyama et al; Electric Drive of LCD's; Display and Imaging 1994, vol. 33, pp. 117-131.
Japanese Office Action dated Apr. 3, 2012 (and English translation thereof) in counterpart Japanese Application No. 2007-125596.
Japanese Office Action dated Dec. 17, 2013 (and English translation thereof) in counterpart Japanese Application No. 2013-026480.

* cited by examiner

*Primary Examiner* — Ryan A Lubit
(74) *Attorney, Agent, or Firm* — Holtz, Holtz, Goodman & Chick, PC

(57) ABSTRACT

A mono domain vertical alignment type liquid crystal display apparatus to be multiplex driven is provided whose display uniformity at a large pretilt angle (near 90°) is improved. Waveform A is applied to a liquid crystal cell of a mono domain vertical alignment type, the waveform A having a duty not lower than 4 and a frame frequency of f. The frame frequency f is determined from a pretilt angle θp, and is a frequency not lower than 60 Hz at a pretilt angle of $88.5° \leq \theta p < 89.6°$ or a frequency not lower than $[120 \times (\theta p - 89.6) + 60]$ Hz at a pretilt angle of $89.6° \leq \theta p \leq 89.9°$.

7 Claims, 13 Drawing Sheets

VERTICAL ALIGNMENT TYPE LIQUID CRYSTAL DISPLAY APPARATUS HAVING IMPROVED DISPLAY UNIFORMITY

CROSS REFERENCE TO RELATED APPLICATION

This application is based on and claims priority of Japanese Patent Application No. 2007-125596 filed on May 10, 2007, the entire contents of which are incorporated herein by reference.

BACKGROUND OF THE INVENTION

A) Field of the Invention

The present invention relates to a liquid crystal display apparatus, and more particularly to a liquid crystal display apparatus having a vertical alignment type liquid crystal cell.

B) Description of the Related Art

A "vertical alignment type" liquid crystal display (LCD) device, whose liquid crystal molecules in a liquid crystal layer of a liquid crystal cell are aligned vertical to a substrate, shows a very good black level during no voltage application. Very good view angle characteristics are obtained when an optical compensation plate having negative optical anisotropy with proper parameters is disposed between the liquid crystal cell and at least one of the upper and lower polarization plates.

One type of the vertical alignment type liquid crystal display device is a mono domain vertical alignment type liquid crystal device. Alignment of the mono domain vertical alignment type liquid crystal device is controlled to have a uniform alignment state in the liquid crystal layer, independently from whether a voltage is applied or not. In order to prevent alignment defects during voltage application, it is necessary to set a pretilt angle so that liquid crystal molecules slightly tilt from the vertical to the substrate even during no voltage application.

An alignment control method of this type includes a "metal oxide oblique vapor deposition method" of vapor-depositing an $SiO_x$ film along an oblique direction to the substrate, on an alignment film disposed on inner surfaces of the upper and lower substrates, a method of coating a polymer alignment film such as polyimide on a substrate and then performing a rubbing process, and other methods. The rubbing process is advantageous in terms of production. However, a rubbing process similar to that in manufacture processes for a twisted nematic (TN) type liquid crystal display device, may often form stripe flaws along a rubbing direction, posing a fear of degrading considerably a display quality.

The present inventor and his colleagues have proposed alignment process techniques suppressing flaws during rubbing in JP-A-2005-234254, the entire contents of which are incorporated herein by reference. A method disclosed in this Publication can realize a mono domain vertical alignment type liquid crystal display device capable of suppressing flaws and having a pretilt angle of, e.g., 88.5° to 89.5°.

Another type of the vertical alignment type liquid crystal display device is a multi domain vertical alignment type liquid crystal display device. The multi domain vertical alignment type device has a plurality of liquid crystal molecule orientations in one pixel so that the view angle characteristics of the display device can be improved during voltage application.

As a multi domain alignment control method, for example, JP-A-HEI-3-259121 and Japanese Patent Publication No. 3834304, the entire contents of both documents are incorporated herein by reference, propose an "oblique electric field alignment control method" of forming rectangular openings through partial areas of electrodes formed on inner surfaces of upper and lower substrates, constituting pixels and controlling alignment orientations of liquid crystal molecules by oblique electric fields formed near the openings during voltage application.

One of a driving method for a vertical alignment type liquid crystal display device is a multiplex driving method The summary of main specific features of a present (direct) multiplex driving method is explained, for example, in a document "An Electrical Driving Method for LCD", written by Takashi SUGIYAMA and Shunsuke KOBAYASH, in Magazine: Display and Imaging, pp. 117 to 131, Vol. 3, 1994 published by Science/Communications/International.

The most general driving method is an "optimum biasing method". An electro-optic response of a liquid crystal display is determined by an effective voltage value, and an alternate current drive (an average voltage is 0) is fundamental because deterioration of the device performance can be prevented. Driving waveforms realizing this include: "intra-frame reversal driving (or one line reversal driving)" of reversing a polarity during one line selection as shown in FIG. 9A (hereinafter this driving waveform is called waveform A); "frame reversal driving" of reversing a polarity at each frame as shown in FIG. 9B (hereinafter this driving waveform is called waveform B); and "N-line reversal driving" which is based on waveform B and reverses a polarity at N-lines to reduce crosstalks (in the above-described explanatory document, the second kind crosstalks) in high duty driving as shown in FIG. 9C (hereinafter this driving waveform is called waveform C).

FIGS. 9A to 9C show driving waveforms applied across upper and lower electrodes of one pixel. Waveform B having the lowest consumption power during driving is widely used for the present multiplex driving LCD.

A method of suppressing a phenomenon "frame response" which occurs when a response speed of a liquid crystal display device is high includes: an active addressing method by which a plurality of select times are assigned to one frame; and "a multi line simultaneous select method" (hereinafter this driving waveform is called waveform MLS) of selecting N lines in one frame at the same time as shown in FIG. 12, disclosed, for example, in Japanese Patent Publication No. 3119737. The latter method is often used for driving a high speed response STN-LCD having a duty ratio under 1/16 (a duty number is larger than 16).

FIG. 12 shows an example of 2 lines simultaneous select drive (2-line MLS) waveform at 1/16 duty ratio drive. This waveform corresponds to the case that both 2 lines are on-state. There are 2 levels for segment voltage VL0 and VL1 when 2 lines are simultaneously selected. The voltage VL0 is 0V.

SUMMARY OF THE INVENTION

In order to suppress alignment flaws and obtain a good display state of a mono domain vertical alignment type liquid crystal display device, it is necessary to set a pretilt angle smaller than 90°. As shown in FIG. 10A, if a pretilt angle is larger than 89.5°, particularly larger than 89.7°, there is a tendency that the maximum transmissivity Tmax of the electro-optic characteristics lowers as the pretilt angle becomes larger toward 90°.

As shown in FIG. 10B, there is a tendency in multiplex driving that a device contrast CR becomes high as the pretilt angle becomes as near 90° as possible. This may be ascribed to improved steepness near the threshold value of the electro-optic characteristics. Data shown in FIGS. 10A and 10B is disclosed in JP-A-2005-234254.

From the viewpoint of contrast improvement, a pretilt angle is preferably set near 90°. However, as the pretilt angle is set near 90°, a transmissivity during bright display lowers and the display quality degrades.

FIG. 11 shows a display example of a vertical alignment type liquid crystal device of a segment display type setting a tilt angle of 89.6°. A rubbing direction of an upper substrate is a downward direction of the drawing sheet, and a rubbing direction of a lower substrate is a upward direction of the drawing sheet. Waveform B was used as a driving waveform, and the device was operated at a frame frequency of 80 Hz under the driving conditions of a duty ratio of 1/8 and a bias ratio of 1/4. There were areas having a partially dark state in the effective display area, and it confirmed that the display uniformity was considerably degraded. This phenomenon can be considered to cause the above-described lowered transmissivity of the electro-optic characteristics.

Also in the vertical alignment type display device using the oblique electric field alignment control method disclosed in Japanese Patent Publication No. 3834304, display uniformity lowers and a transmissivity lowers in some cases, similar to the mono domain type.

An object of this invention is to provide a mono domain vertical alignment type liquid crystal display device to be multiplex-driven, having improved display uniformity at a large (near 90°) pretilt angle.

Another object of this invention is to provide a multi domain vertical alignment type liquid crystal display device to be multiplex-driven, having improved display uniformity.

According to one aspect of the present invention, there is provided a liquid crystal display apparatus comprising: a liquid crystal cell of a mono domain vertical alignment type; and a driver apparatus for applying a driving waveform to the liquid crystal cell, wherein the liquid crystal cell of the mono domain vertical alignment type comprises: first and second substrates disposed facing each other; a liquid crystal layer sandwiched between the first and second substrates; and first and second vertical alignment films formed above the first substrate on a side of the liquid crystal layer and above the second substrate on a side of the liquid crystal layer, and subjected to antiparallel rubbing to give liquid crystal molecules in the liquid crystal layer with a pretilt angle θp in a range between 18.5° and 89.9° and with mono domain alignment; the driver apparatus applies the liquid crystal cell with waveform A having a duty not lower than 4 and a frame frequency of f; and the frame frequency f is determined from the pretilt angle θp, and is a frequency not lower than 60 Hz at a pretilt angle of 88.5°≤θp<89.6° or a frequency not lower than [120×(θp−89.6)+60] Hz at a pretilt angle of 89.6°≤θp≤89.9°.

According to another aspect of the present invention, there is provided a liquid crystal display apparatus comprising: a liquid crystal cell of an oblique electric field alignment control multi domain vertical alignment type; and a driver apparatus for applying a driving waveform to the liquid crystal cell, wherein the liquid crystal cell of the oblique electric field alignment control multi domain vertical alignment type comprises: first and second substrates disposed facing each other; a liquid crystal layer sandwiched between the first and second substrates; and first and second electrode layers formed above the first substrate on a side of the liquid crystal layer and above the second substrate on a side of the liquid crystal layer, a plurality of openings being formed through the first and second electrode layer, openings formed in the first electrode layer and openings formed in the second electrode layer being alternately disposed side by side along one direction in a display plane; and the driver apparatus applies the liquid crystal cell with waveform A having a frame frequency not lower than 60 Hz.

The mono domain vertical alignment type liquid crystal display cell is applied with, e.g., waveform A at a frame frequency sufficiently high for a pretilt angle. Since formation of a dark area is suppressed, the display uniformity can be improved.

The multi domain vertical alignment type liquid crystal display cell by the oblique electric field alignment control is applied with, e.g., waveform A at a sufficiently high frame frequency. Since formation of a dark area is suppressed, the display uniformity can be improved.

DESCRIPTION OF THE PREFERRED EMBODIMENTS

First, description will be made on first to third experiments studying the display states of mono domain vertical alignment type liquid crystal display apparatus.

Figure 1:
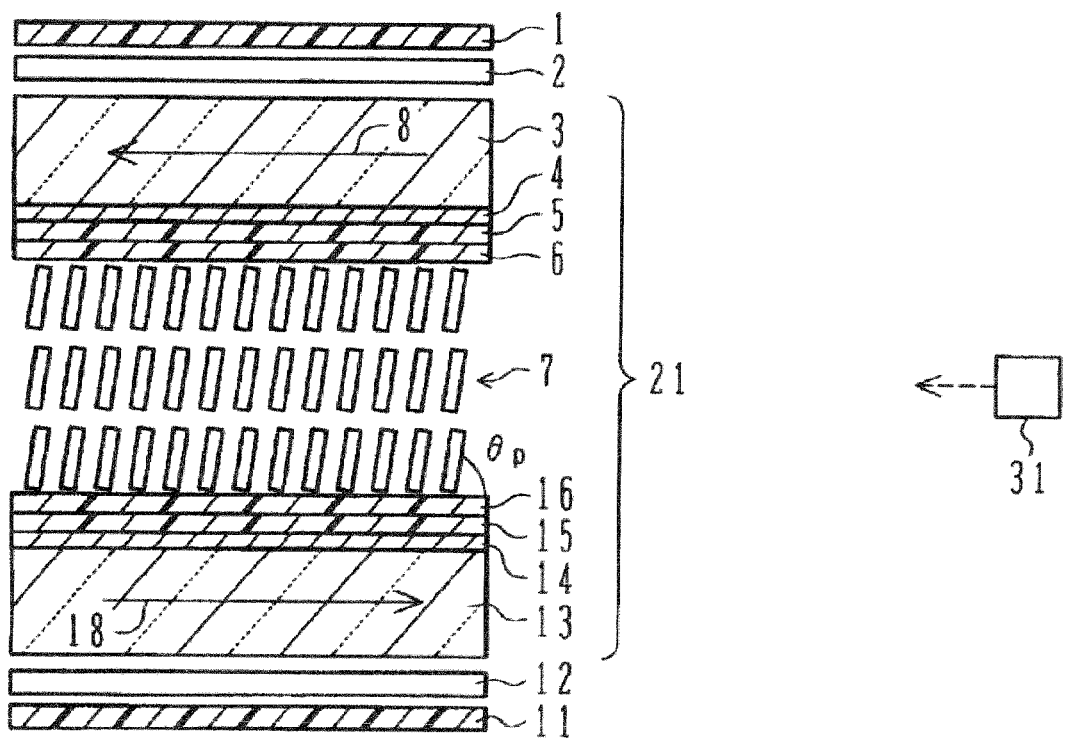
FIG. 1 is a schematic cross sectional view showing a typical example of the structure of a mono domain vertical alignment type liquid crystal display apparatus.

FIG. 1 is a schematic cross sectional view showing a typical example of the structure of a mono domain vertical alignment type liquid crystal display apparatus. Transparent electrodes 4 and 14 formed with desired patterns, insulating films 5 and 15 and upper and lower vertical alignment films 6 and 16 are formed on the inner surfaces of upper and lower glass substrate 3 and 13 respectively, in this order from the substrate side. A liquid crystal layer 7 made of liquid crystal material having a dielectric constant anisotropy $\Delta\epsilon<0$ is sandwiched between the upper and lower vertical alignment films 6 and 16. When necessary, the structure omitting one or both of the upper and lower insulating films 5 and 15 may also be adopted.

The upper and lower vertical alignment films 6 and 16 are subjected to a rubbing process in such a manner that a rubbing direction 8 of the upper vertical alignment film 6 is antiparallel to a rubbing direction 18 of the lower vertical alignment film 16 The rubbing process controls a pretilt angle $\theta p$ of a liquid crystal molecule inclination angle at interfaces between the liquid crystal layer 7 and the alignment films 6 and 16. The pretilt angle $\theta p$ is defined by an inclination from the alignment film surface. If pretilt is not given, the pretilt angle $\theta p$ is 90°. A desired pretilt angle $\theta p$ is given in a range from 88.5° to 89.9° by the rubbing process to form a mono domain vertical alignment type liquid crystal display cell. Mono domain alignment may be realized by the rubbing process for only one of the upper and lower alignment films.

The vertical alignment films 6 and 16 are preferably made of polymer having a surface free energy of 35 mN/m to 39 mN/m. By using such material for the vertical alignment film, rubbing flaws on the alignment film surface can be suppressed. This rubbing method is disclosed in the column "Description of the Preferred Embodiments" of JP-A-2005-234254.

Polarizer plates 1 and 11 are bonded to the outsides of the upper and lower glass substrates 3 and 13, respectively, via view angle compensation plates 2 and 12. The polarizer plates 1 and 11 are disposed in a cross Nichol state so that the absorption axes have an angle of about 45° relative to the rubbing directions in the display plane. When necessary, one of the upper and lower view angle compensation plates 2 and 12 may be omitted.

A liquid crystal cell 21 is constituted of the glass substrates 3 and 13, transparent electrodes 4 and 14, vertical alignment films 6 and 16, liquid crystal layer 7, and when necessary, insulating films 5 and 15. A driver apparatus 31 applies a driving waveform across the transparent electrodes 4 and 14 of the liquid crystal cell 21 to control the display state.

Next, description will be made on the specific structure of an apparatus used for the first to third experiments. A segment display type was used as a display device. A structure was used which does not dispose the insulating film between the transparent electrode and vertical alignment film. A vertical alignment film A manufactured by Chisso Petrochemical Corporation was used to form the vertical alignment film by flexography. A cotton rubbing cloth was used for the rubbing process. By properly changing the rubbing conditions and adjusting a rubbing strength, a pretilt angle $\theta p$ of 88.5° to 89.9° was set. The rubbing directions of the upper and lower substrates were set antiparallel when the upper and lower substrates are bonded.

An empty cell was manufactured by adjusting a liquid crystal layer thickness to 4 μm and bonding the upper and lower substrates. Material having a dielectric constant anisotropy $\Delta\epsilon<0$ and a refractive index anisotropy $\Delta n=0.15$ manufactured by Merck Ltd., Japan was vacuum-injected into the empty cell. Thereafter, an injection port was sealed, and heat treatment was performed for about one hour at a temperature not lower than an isotropic phase temperatur of liquid crystal material. The absorption axes of the upper and lower polarizer plates were disposed at an angle of about 45° relative to the liquid crystal molecule alignment orientation in the central area along a liquid crystal layer thickness direction.

In the first to third experiments, studies were made on how dependency of a display state upon a frame frequency changes with a duty ratio, a driving waveform, and a pretilt angle. A driving waveform was applied across the upper and lower electrodes by using an amplifier manufactured by FLC Electronics Inc. and an arbitrary waveform generator Biomation 2202A. The driving waveform allowed all segments to be applied with an on-waveform. About an upper half of an S-character shaped segment was observed with a microscope. For a pretilt angle, a measured value by a crystal rotation method was used.

First, the first experiments will be described changing a duty ratio. In the first experiments, waveform B was applied to a liquid crystal cell having a pretilt angle of 89.6°, by changing the duty ratio. A bias ratio was also changed in accordance with a duty ratio.

Figure 2:
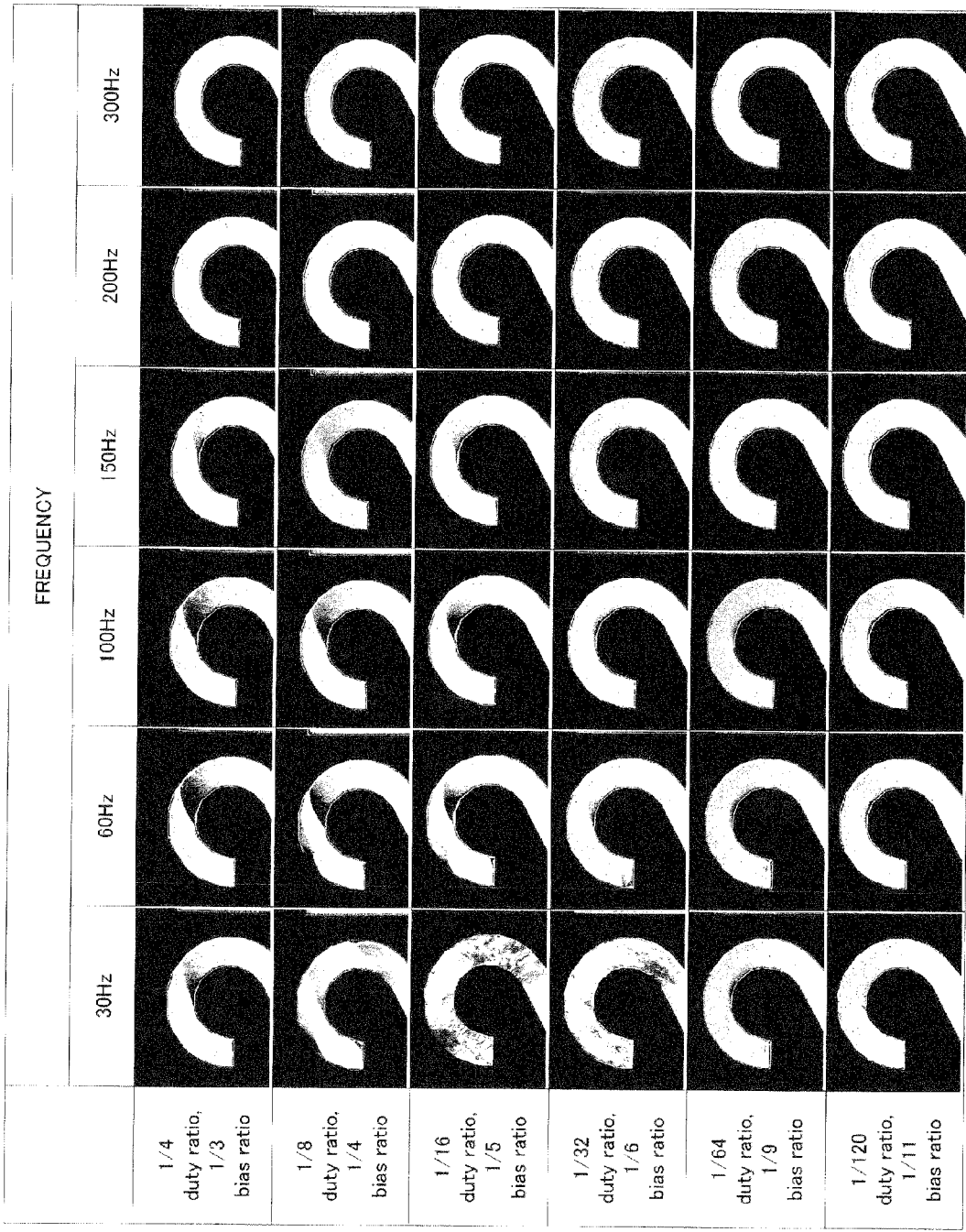
FIG. 2 shows microscopic photographs indicating first experiment results.

FIG. 2 shows the first experiment results. Microscopic photographs of approximately upper halves of the S-character shaped segments are shown side by side. In the photograph, the S-character is reversed because the liquid crystal display device was observed from the rear.

In the row direction, frame frequencies of 30 Hz, 60 Hz, 100 Hz, 150 Hz, 200 Hz and 300 Hz are juxtaposed in this order from the left side. In the column direction, duty ratios and bias ratios of 1/4 duty ratio and 1/3 bias ratio, 1/8 duty ratio and 1/4 bias ratio, 1/16 duty ratio and 1/5 bias ratio, 1/32 duty ratio and 1/6 bias ratio, 1/64 duty ratio and 1/9 bias ratio, and 1/120 ratio duty and 1/11 bias ratio are juxtaposed in this order from the upper side. The denominator of a duty ratio is called duty or duty number.

At the frame frequency of 30 Hz, a flowing dark area (the phenomenon that although not observed in the photographs, a shade in a segment display area flows) was observed at a high duty not smaller than 16, whereas a fixed dark area was observed at duties of 4 and 8. In the observation at the frame frequency of 30 Hz, an area of the dark area is broadest at a duty of 4, and it was observed that the area of the dark area becomes narrow as the duty becomes higher. However, every dark area causes display irregularity in terms of visual observation.

At a frame frequency of 60 Hz, the dark area was fixed in all duty conditions. There was also a tendency that the area of the dark area becomes narrow as the duty becomes higher.

As the frame frequency is raised, it has been found that the dark area can be removed at a frequency not lower than 100 Hz at a duty of 120, at a frequency not lower than 150 Hz at a duty of 32 and at a duty of 64, and at a frequency not lower than 200 Hz at a duty of 4 to 16.

It has been found that the dark area is removed and a good stable display state can be obtained at any duty ratio by setting the frame frequency sufficiently high.

Next, the second experiments will be described changing the driving waveform. In the second experiments, waveform A, waveform B, waveform C with driving conditions of a duty ratio of 1/16 and a bias ratio of 1/5 and waveform MLS with a duty ratio condition of 1/16 were applied to a liquid crystal cell having a pretilt angle of 89.6°. A polarity was reversed at a polarity reversal line number M=7 for waveform C, and a simultaneous select line N=2 was used for waveform MLS.

The reason why the duty ratio of 1/16 was selected is as follows. Since the dark area causing the display irregularity is broadest in the first experiments at the duty ratio of 1/4 to 1/16, the duty ratio of 1/16 was selected representing the duty ratio of 1/4 to 1/16.

Figure 3:
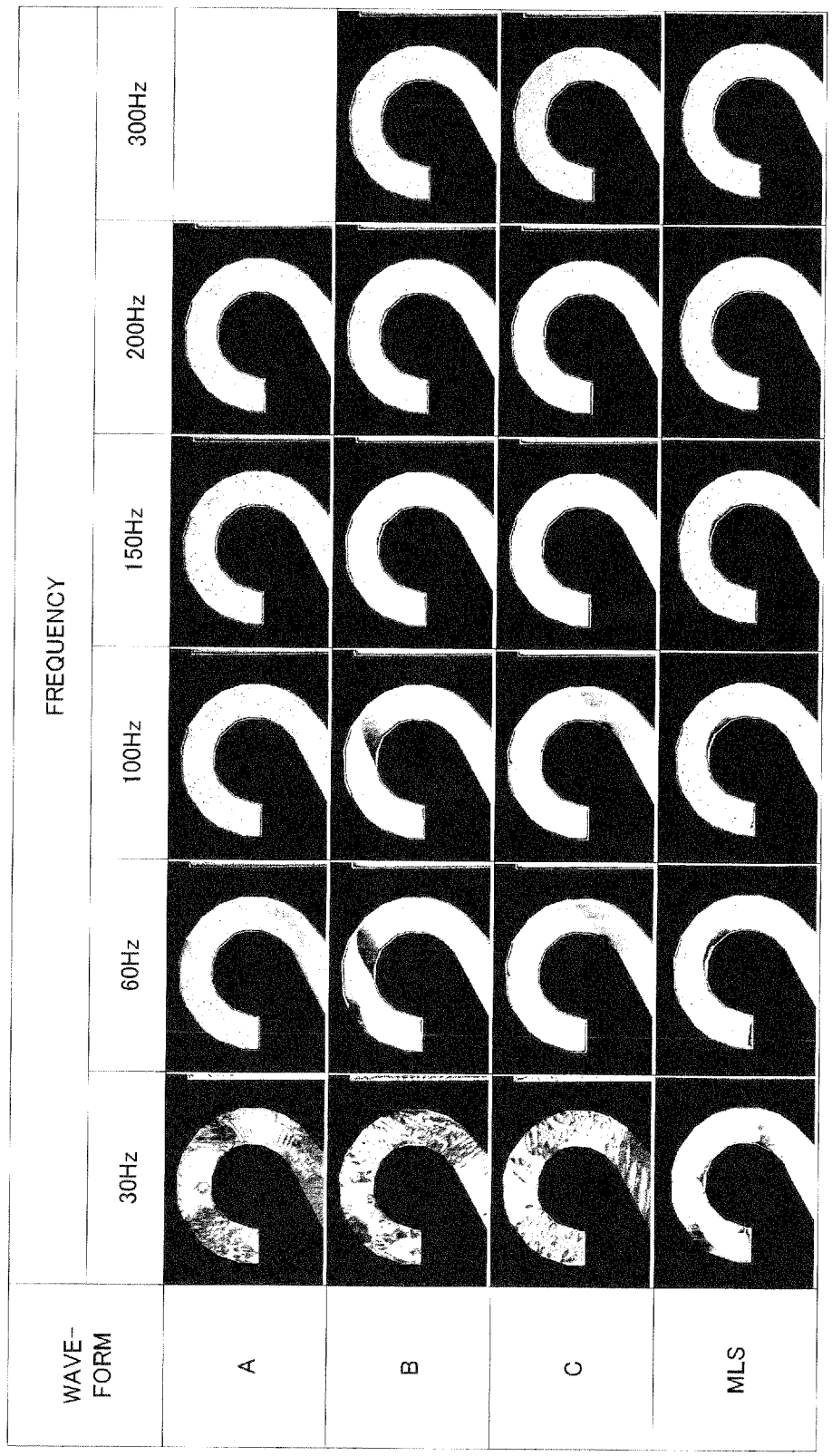
FIG. 3 shows microscopic photographs indicating second experiment results.

FIG. 3 shows the second experiment results. Microscopic photographs of approximately upper halves of the S-character shaped segments are shown in a matrix shape for frame frequencies and driving waveforms. In the row direction, frame frequencies of 30 Hz, 60 Hz, 100 Hz, 150 Hz, 200 Hz and 300 Hz are juxtaposed in this order from the left side. In the column direction, driving waveforms of waveform A, waveform B, waveform C and waveform MLS are juxtaposed in this order from the upper side.

At a frame frequency of 30 Hz, a flowing dark area was observed for all waveforms, and a continuous change in dark/bright was observed.

At a frame frequency of 60 Hz, a distinct change was observed for each driving waveform. Although a fixed dark area was observed for waveform B, waveform C and waveform MLS, a fixed dark area was observed not at all for waveform A. The position of the dark area is different for each of waveform B, waveform C and waveform MLS, and a distribution of dark areas is broadest for waveform B, and becomes narrow in the order of waveform C and waveform MLS.

At a frame frequency of 100 Hz, the dark area was rarely observed for waveform C and waveform MLS, and at a frame frequency of 200 Hz, a dark area was able to be removed for waveform B.

In a frequency range not lower than the frame frequency at which the dark area is removed, display uniformity can be obtained. Namely, the state without observation of the dark area can be maintained at a frame frequency not lower than 60 Hz for waveform A, at a frame frequency not lower than 100 Hz for waveform C and waveform MLS, and at a frame frequency not lower than 200 Hz for waveform B.

Similar experiments were conducted also for duty conditions of 4 and 8, and a tendency almost the same as that for a duty of 16 was confirmed, except that a fixed dark area is formed at a frame frequency of 30 Hz.

It can be considered that the dark area is formed because a liquid crystal molecule alignment orientation in the liquid crystal layer shifts from the orientation defined by the rubbing direction. It has been found that a good display state without observation of the dark area can be obtained for every driving waveform, by setting the frame frequency sufficiently high. The frame frequency necessary for not forming the dark area changes with the driving waveform, and is lowest for waveform A, next lowest for waveform C and waveform MLS, and highest for waveform B.

Studies similar to the first experiments changing the duty ratio were made also for waveform A, waveform C (polarity reversal line number M=7) and waveform MLS (simultaneous select line number N=2, although N=4 at a high duty not smaller than 64). It has been found that waveform B has the highest frame frequency necessary for display uniformity, also in the case that the duty ratio is changed. The frame frequency necessary for display uniformity can be lowered in the order of waveform C, waveform MLS and waveform A, which is similar to the second embodiment results.

It can be considered from the above-described first and second experiment results that there is a tendency that the dark area reduces as high frequency components of the driving waveform increase. Even at the low frame frequency, the display state can be made uniform by using the driving waveform having high frequency components as much as possible. Waveforms, particularly waveform A, waveform C and waveform MLS are preferable.

Next, description will be made on the third experiments changing a pretilt angle of an antiparallel alignment liquid crystal display device. In the third experiments, waveform B under the 1/16 duty ratio and 1/5 bias ratio driving conditions was applied to each liquid crystal cell having a different pretilt angle.

Figure 4:
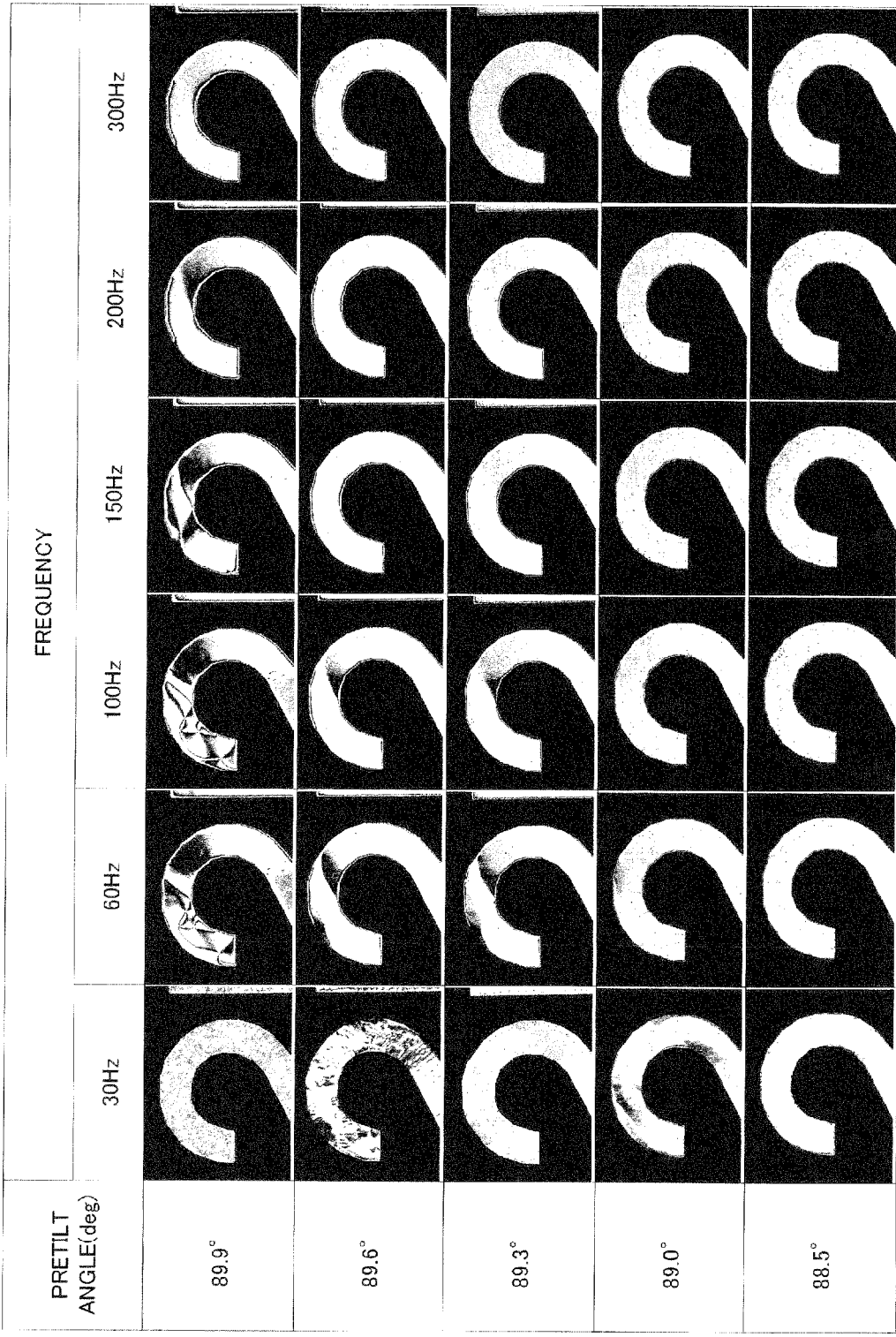
FIG. 4 shows microscopic photographs indicating third experiment results.

FIG. 4 shows the third experiment results. Similar to the first and second experiments, microscopic photographs of approximately upper halves of the S-character shaped segments are shown side by side, for frame frequencies and pretilt angles. In the row direction, frame frequencies of 30 Hz, 60 Hz, 100 Hz, 150 Hz, 200 Hz and 300 Hz are juxtaposed in this order from the left side. In the column direction, pretilt angles of 89.9°, 89.6°, 89.3°, 89.0° and 88.5° are juxtaposed in this order from the upper side.

At a frame frequency of 30 Hz, a flowing dark area was observed at a pretilt angle of 89.0° to 89.9°, similar to the observation at the frame frequency of 30 Hz of the first and second experiments However, at a pretilt angle of 88.5°, a uniform display state was obtained without observation of the dark area at all. At a frame frequency of 60 Hz, all the dark areas were fixed. It has been found that an area of the dark area is broader at a pretilt angle near 90°. At a frame frequency of 100 Hz, it was observed that the dark area was removed at a pretilt angle of 89.0°, and that the area of the dark area became gradually narrow at other pretilt angles.

At a frame frequency of 200 Hz, the dark area was removed at pretilt angles of 89.3° and 89.6°. However, at a pretilt angle of 89.9°, the dark area was not able to be removed even at a frame frequency of 300 Hz.

As described above, it has been found that the larger the pretilt angle is, the dark area is more likely to be formed and the frame frequency capable of removing the dark area becomes higher.

Experiments have also been conducted changing a pretilt angle for other driving waveforms, and studies were made on the conditions capable of stable display without observation of the dark area, for the mono domain vertical alignment type liquid crystal display device.

As described already, it has been found that although the dark area cannot be removed even at the frame frequency of 300 Hz for waveform B at a pretilt angle of 89.9°, the dark area can be removed at the frame frequency not lower than 380 Hz.

Figure 5:
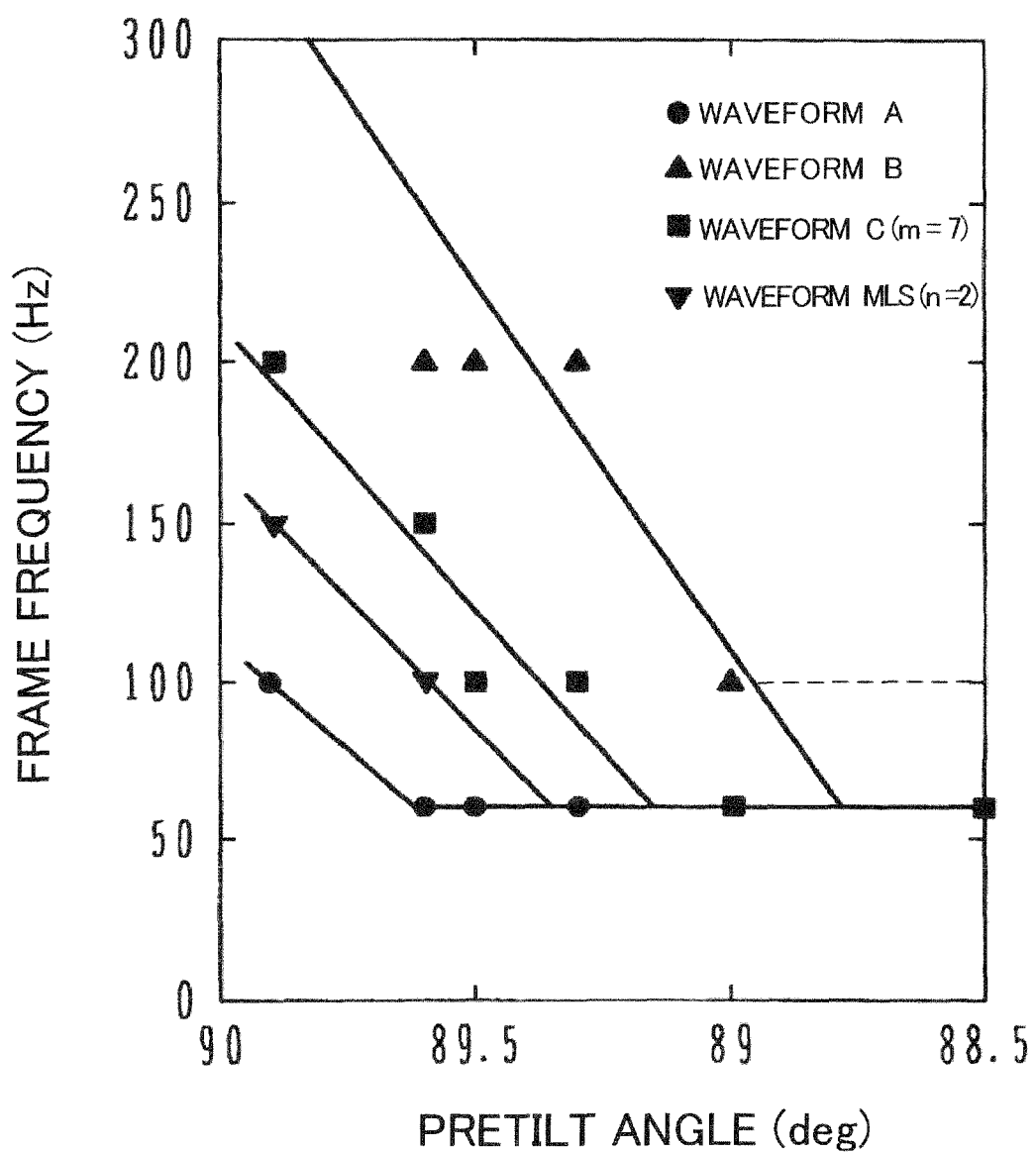
FIG. 5 is a graph collectively indicating the conditions capable of stable display at each driving waveform.

FIG. 5 is a graph collectively showing the conditions of stable display for each driving waveform. This graph shows the experiment results for waveform A, waveform B and waveform C (polarity reversal line number M=7) for a duty ratio of 1/16 and a bias ratio of 1/5 and for waveform MLS (simultaneous line select number N=2) for a duty ratio of 1/16. The abscissa represents a pretilt angle θp in the unit of degree, and the ordinate represents a frame frequency in the unit of Hz, The pretilt angle θp on the abscissa is shown reducing toward the right side.

An area upper than each curve (border line) for each of waveform A, waveform B, waveform C and waveform MLS is an area capable of stable display while suppressing the generation of the dark area.

As described earlier, there is a tendency that a flowing dark area is likely to be formed at a frame frequency of about 30 Hz, and a dark area is fixed at a frame frequency not lower than 60 Hz. In order to suppress the generation of the flowing dark area, it is generally considered that the frame frequency is set not lower than 60 Hz. Namely, it is considered that a lower limit of the frame frequency is set to 60 Hz for all of waveform A, waveform B, waveform C and waveform MLS.

In driving a general liquid crystal display device, it is rare that the driving frequency is set to 50 Hz or lower, and a frequency is set in many cases to 60 Hz or higher. It can be considered proper from these viewpoints that a lower limit of the frame frequency is set to 60 Hz.

As already mentioned, although the dark area will not be formed if the pretilt angle is as sufficiently smaller as about 88.5°, the dark area can be observed if the pretilt angle becomes a certain angle or larger (becomes near 90°). If the frame frequency is set sufficiently high, the dark area can be removed. However, the frame frequency necessary for removing the dark area becomes high as the pretilt angle becomes large.

Therefore, the frame frequency constituting a border of an area where good display is possible is set to 60 Hz in a pretilt angle range in which the dark area will not be formed, and is raised from 60 Hz in accordance with an increase in the pretilt angle in a pretilt angle range in which the dark area is formed. Each driving waveform has a different critical pretilt angle at which the dark area appears (a pretilt angle rising from the frame frequency of 60 Hz in FIG. 5) and a different gradient along which the frame frequency is increased.

From the viewpoint that the dark area is difficult to be formed up to a large pretilt angle and that the frame frequency at which the dark area can be removed can be suppressed low, waveform A is most preferable, and preferable in the order of waveform MLS (simultaneous select line number N=2), waveform C (polarity reversal line number M=7), and waveform B.

The curve of each driving waveform shown in FIG. 5 is for a duty of 16. However, as seen from the first and second experiments, the frame frequency dependency is almost the same even at the duties of 4 and 8. It has also been confirmed that the dependency upon the pretilt angle is the same.

Figure 13:
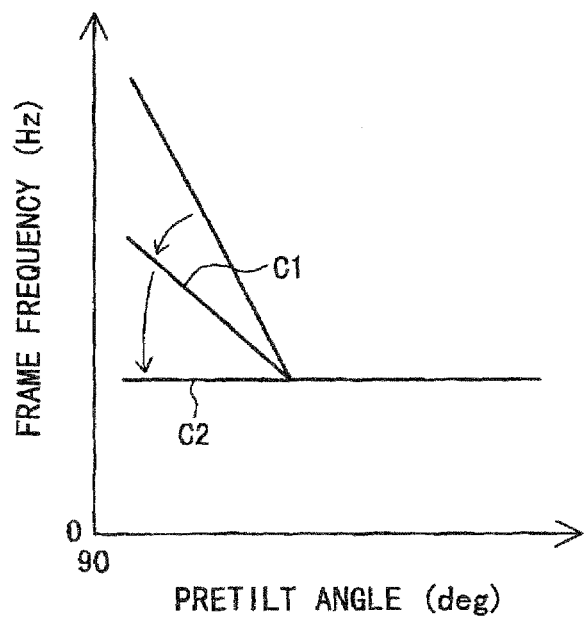
FIG. 13 is a graph showing the relation between the duty and the gradient of frame frequency increase relative to pretilt angle increase.

As described above, as the duty is made higher, the dark area can be suppressed easily. When the duty is sufficiently high (not lower than 32, for example), the gradient of frame frequency increase with respect to pretilt angle increase can be made gentle (suppressed to about half of that when the duty is 16, for example, see FIG. 13, curve C1), By further increasing the duty (not lower than 120, for example), the gradient can be set to 0 (see FIG. 13, curve C2), which means that a constant frame frequency can suppress the dark area.

Next, description will be made on the conditions capable of suppressing the dark area and displaying uniformly for each driving waveform. First, waveform A will be described. At a duty not lower than 4 (particularly a duty of 4 to 31 or a duty ratio of 1/4 to 1/31), uniform display can be obtained at a frame frequency not lower than bout 60 Hz, if a pretilt angle is 88.5°≤θp<89.6°, and uniform display can be obtained at a frame frequency not lower than about [120×(θp−89.6)+60] Hz, if a pretilt angle is 89.6°≤θp≤89.9°.

At a pretilt angle of 89.6°≤θp≤89.9°, uniform display can be obtained at a frame frequency not lower than about [60×(θp−89.6)+60] Hz if a duty is not lower than 32 (particularly a duty of 32 to 119 or a duty ratio of 1/32 to 1/119), and uniform display can be obtained at a frame frequency not lower than about 60 Hz if a duty is not lower than 120 (a duty ratio is not larger than 1/120).

Next, waveform B will be described. At a duty not lower than 4 (particularly a duty of 4 to 31), uniform display can be obtained at a frame frequency not lower than about 60 Hz, if a pretilt angle is 88.5°≤θp≤88.8°, and uniform display can be obtained at a frame frequency not lower than about [312×(θp−88.8)+60] Hz, if a pretilt angle is 88.8°≤θp≤89.9°.

At a pretilt angle of 88.8°≤θp≤89.9°, uniform display can be obtained at a frame frequency not lower than about [160×(θp−88.8)+60] Hz if a duty is not lower than 32.

Waveform B is likely to form the dark area more than any other waveforms. The lower limit of the frame frequency may be set higher than 60 Hz, e.g., 100 Hz. If the lower limit of the frame frequency is set to 100 Hz, at a duty not lower than 4 (particularly a duty of 4 to 31), the condition of obtaining uniform display is a frame frequency not lower than about 100 Hz, if a pretilt angle is 88.5°≤θp<89.0°, and the condition of obtaining uniform display is a frame frequency not lower than about [312×(θp−89.0)+100] Hz, if a pretilt angle is 89.0°≤θp≤89.9°.

At a pretilt angle of 89.0°≤θp<89.9°, the condition of obtaining uniform display is a frame frequency not lower than about [160×(θp−89.0)+100] Hz if a duty is not lower than 32 (particularly a duty of 32 to 119), and the condition of obtaining uniform display is a frame frequency not lower than about 100 Hz if a duty is not lower than 120.

Next, waveform C will be described. It has been found that if the polarity reversal line number M is set to 1, waveform C can realize display uniformity under almost the same condition as that of waveform A, and that if the polarity reversal line number M is set to 16 which is equal to the duty number (scan line number), waveform C can realize display uniformity under almost the same condition as that of waveform B. Although practically impossible, if the polarity reversal line number M can be set to 1/2, the condition is equal to that for waveform A.

It has been found that if the polarity reversal line number M is set to a half the duty number, the characteristics intermediate between waveform A and waveform B can be obtained. As the polarity reversal line number M becomes smaller, the characteristics similar to waveform A can be obtained. Therefore, the pretilt angle at which the dark area starts to be formed can be made large, and the frame frequency necessary for suppressing the dark area can be made low.

Description will be made on the condition of obtaining uniform display at a polarity reversal line number M=7. At a duty not lower than 4 (particularly a duty of 4 to 31), uniform display can be obtained at a frame frequency not lower than about 60 Hz, if a pretilt angle is 88.5°≤θp<89.2°, and uniform display can be obtained at a frame frequency not lower than about [216×(θp−89.2)+60] Hz, if a pretilt angle is 89.2°≤θp≤89.9°.

At a pretilt angle of 89.2°≤θp≤89.9°, uniform display can be obtained at a frame frequency not lower than about [110×(θp−89.2)+60] Hz if a duty is not lower than 32 (particularly a duty of 32 to 119), and uniform display can be obtained at a frame frequency not lower than about 60 Hz if a duty is not lower than 120.

As compared to a small polarity reversal line number M, a large polarity reversal line number M makes severe the condition of obtaining uniform display. Therefore, if the condition can obtain uniform display at a polarity reversal line number M=7, uniform display can also be obtained at 1 ≤M≤6. Since the duty number is 16, the condition described at the polarity reversal line number M=7 can be considered as the condition capable of obtaining uniform display if the polarity reversal line number M is not larger than a half the duty number.

The condition capable of obtaining uniform display by waveform B can also obtain uniform display even by waveform C if the polarity reversal line number is not smaller than 1 and not larger than the duty number.

Next, waveform MLS will be described. The simultaneous select line number N is set to 2 at a duty of 4 to 63 for waveform MLS, and set to 4 at a duty not smaller than 64.

At a duty not lower than 4 (particularly a duty of 4 to 31), uniform display can be obtained at a frame frequency not lower than about 60 Hz, if a pretilt angle is 88.5°≤θp≤89.3°, and uniform display can be obtained at a frame frequency not lower than about [150×(θp−89.3)+60] Hz, if a pretilt angle is 89.3°≤θp≤89.9°.

At a pretilt angle of 89.3°≤θp≤89.9°, uniform display can be obtained at a frame frequency not lower than about [75×(θp−89.3)+60] Hz if a duty is not lower than 32 (particularly a duty of 32 to 63), and uniform display can be obtained at a frame frequency not lower than about 60 Hz if a duty is not lower than 64.

It can be considered that high frequency components increase as the simultaneous select line number becomes large. Uniform display can be expected to be obtained under the above-described conditions even if the simultaneous select line number N is set to 3 or 4 at a duty of 4 to 63.

The condition capable of obtaining uniform display of a mono domain vertical alignment type liquid crystal display can be estimated for each driving waveform in the manner described above. It is possible to mitigate the inconvenience that display uniformity lowers and a transmissivity lowers at a large pretilt angle. It is effective for suppressing the transmissivity from being lowered particularly at a pretilt angle not smaller than 89.5° and at a pretilt angle not smaller than 89.7°. It is preferable to use waveform A, waveform MLS and waveform C from the viewpoint that display uniformity is realized at a low frame frequency.

For example, an upper limit of the duty is, for example, about 240. An upper limit of the frame frequency is, for example, about 500 Hz, Next, description will be made of the fourth experiments studying the display state of a multi domain vertical alignment type liquid crystal display apparatus by oblique electric field control.

Figure 6:
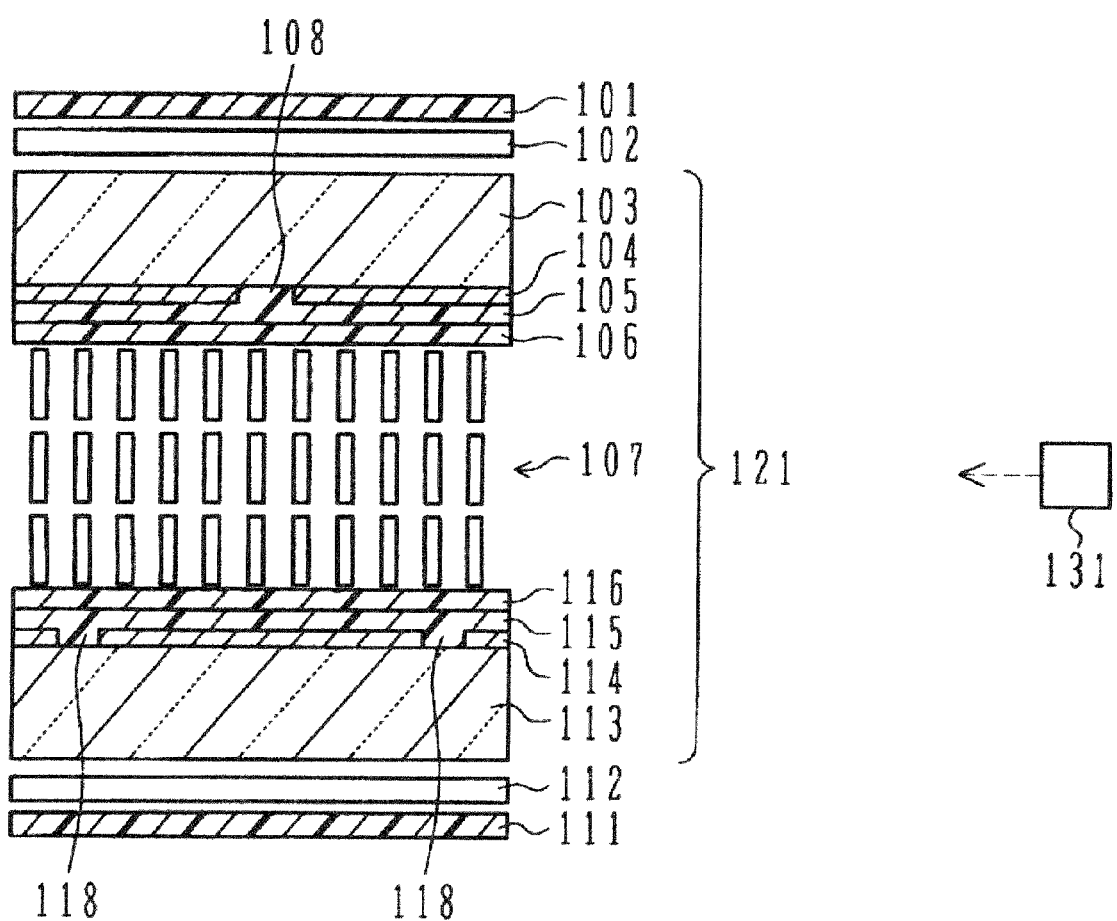
FIG. 6 is a schematic cross sectional view showing a typical example of the structure of a multi domain vertical alignment type liquid crystal display apparatus by the oblique electric field alignment control.

FIG. 6 is a schematic cross sectional view showing a typical example of the structure of a multi domain vertical alignment type liquid crystal display apparatus. Transparent electrodes 104 and 114 formed with desired patterns, insulating films 105 and 115 and upper and lower vertical alignment films 106 and 116 are formed on the inner surfaces of upper and lower glass substrate 103 and 113 respectively, in this order from the substrate side. A liquid crystal layer 107 made of liquid crystal material having a dielectric constant anisotropy $\Delta\epsilon<0$ is sandwiched between the upper and lower vertical alignment films 106 and 116. When necessary the structure omitting one or both of the upper and lower insulating films 105 and 115 may also be adopted.

The vertical alignment films 106 and 116 are preferably made of polymer having a surface free energy of 35 mN/m to 39 mN/m. An alignment process is not performed for the vertical alignment films 106 and 116 so that the pretilt angle is 90°.

In effective display areas of the upper and lower transparent 104 and 114, rectangular slit openings 108 and 118 are formed through partial areas of the electrodes. The opening 108 in the upper electrode 104 and the opening 118 in the lower electrode 114 are alternately disposed along one direction at a predetermined period in the display plane.

Figure 7:
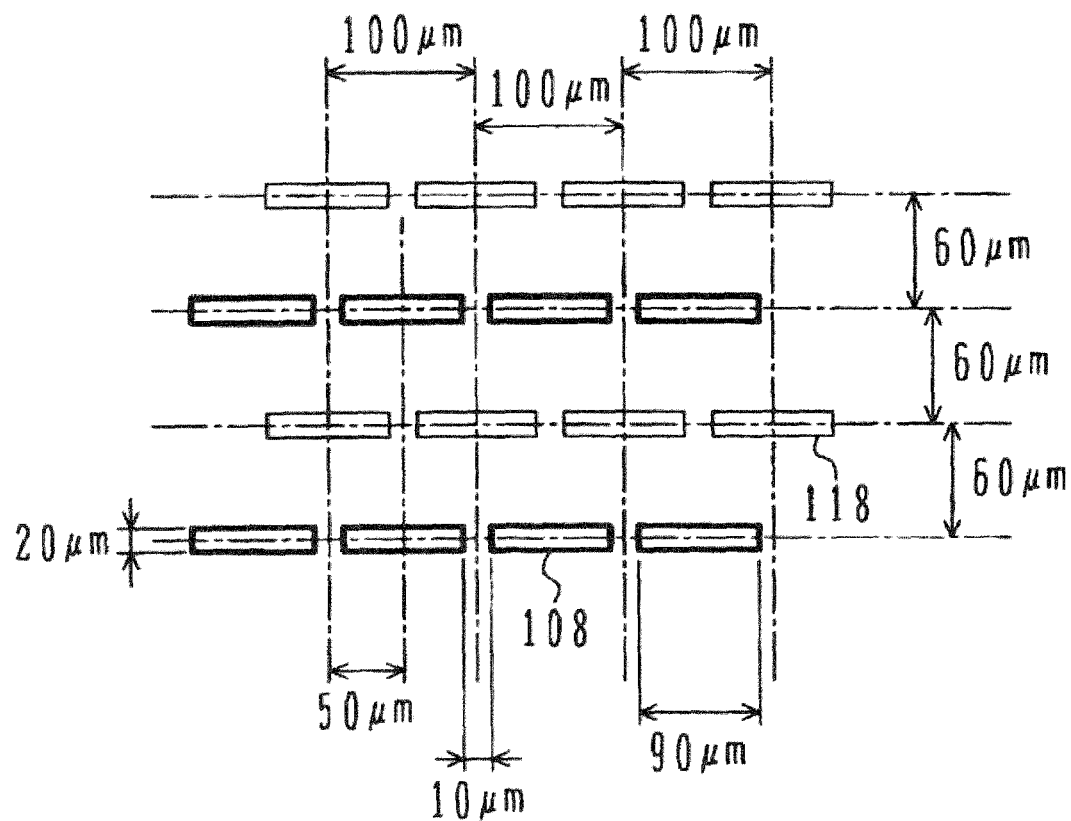
FIG. 7 is a plan view showing an example of the layout of openings in upper and lower electrodes as viewed along a display device surface normal direction.

FIG. 7 shows an example of the layout of the openings 108 and 118 of the upper and lower electrodes. The opening 108 of the upper electrode is indicated by a bold line, and the opening 118 of the lower electrode is indicated by a narrow line. A plurality of openings 108 of the upper electrode are disposed along its longitudinal direction (right/left direction of the drawing sheet) at a constant pitch to form a row. A plurality of rows of the openings 108 are disposed along a direction (up/down direction of the drawing sheet) at a constant pitch.

A length of one opening 108 is, for example, 90 μm, and a space between adjacent openings 108 in the row is, for example, 10 μm. The openings 108 are disposed in each row at a pitch of, e.g., 100 μm. A width of one opening is, for example, 20 μm, and a distance between centers of the adjacent rows of the openings 108 is, for example, 120 μm. The layout of the openings 118 of the lower electrode is similar to that of the upper electrode.

In the display plane, the upper and lower openings 108 and 118 are disposed in such a manner that the row of the upper openings 108 and the row of the lower openings 118 are alternately disposed at a constant pitch along the direction perpendicular to the longitudinal direction of the openings. A distance between centers of the adjacent rows of the openings 108 and 118 is, for example, 60 μm. Along the longitudinal direction of the openings, for example, a center of each opening 118 is positioned at the center of the space between adjacent openings 108. Along the longitudinal direction of the openings, the adjacent openings may be coupled together.

By forming the openings through the upper and lower transparent electrodes, it is possible to apply an electric field oblique to the substrate normal direction, to the upper and lower substrates. The oblique electric field can control the alignment of liquid crystal molecules.

Description continues reverting to FIG. 6. Polarizer plates 101 and 111 are bonded to the outsides of the upper and lower glass substrates 103 and 113, respectively, via view angle compensation plates 102 and 112. The polarizer plates 101 and 111 are disposed in a cross Nichol state so that the absorption axes have an angle of about 45° in the display plane relative to the longitudinal direction of the slit openings 108 and 118. When necessary, one of the upper and lower view angle compensation plates 102 and 112 may be omitted.

A liquid crystal cell 121 is constituted of the glass substrates 103 and 113, transparent electrodes 104 and 114, vertical alignment films 106 and 116, liquid crystal layer 107, and when necessary, insulating films 105 and 115. A driver apparatus 131 applies a driving waveform across the transparent electrodes 104 and 114 of the liquid crystal cell 121 to control the display state.

Next, description will be made on the specific structure of an apparatus used for the fourth experiments. A segment display type was used as a display device A structure was used which does not dispose the insulating film between the transparent electrode and vertical alignment film. A vertical alignment film A manufactured by Chisso Petrochemical Corporation was used to form the vertical alignment film by flexography. A rubbing process was not performed. The layout shown in FIG. 7 was used as the layout of openings of the transparent electrodes.

An empty cell was manufactured by adjusting a liquid crystal layer thickness to 4 μm and bonding the upper and lower substrates. Material having a dielectric constant anisotropy $\Delta\epsilon<0$ and a refractive index anisotropy $\Delta n=0.15$ manufactured by Merck Ltd., Japan was vacuum-injected into the empty cell. Thereafter, an injection port was sealed, and heat treatment was performed for about one hour at a temperature not lower than an isotropic phase temperatur of liquid crystal material. The absorption axes of the upper and lower polarizer plates were disposed at an angle of about 45° relative to the longitudinal direction of the slit openings.

In the fourth experiments, as driving waveforms to be applied to an oblique electric field alignment control type liquid crystal display device, waveform A, waveform B and waveform C (polarity reversal line number M=7) were used, and the display state when the frame frequency was changed at the on-voltage under the conditions of a duty ratio of 1/16 and a bias ratio of 1/5 was observed with a microscope.

Figure 8:
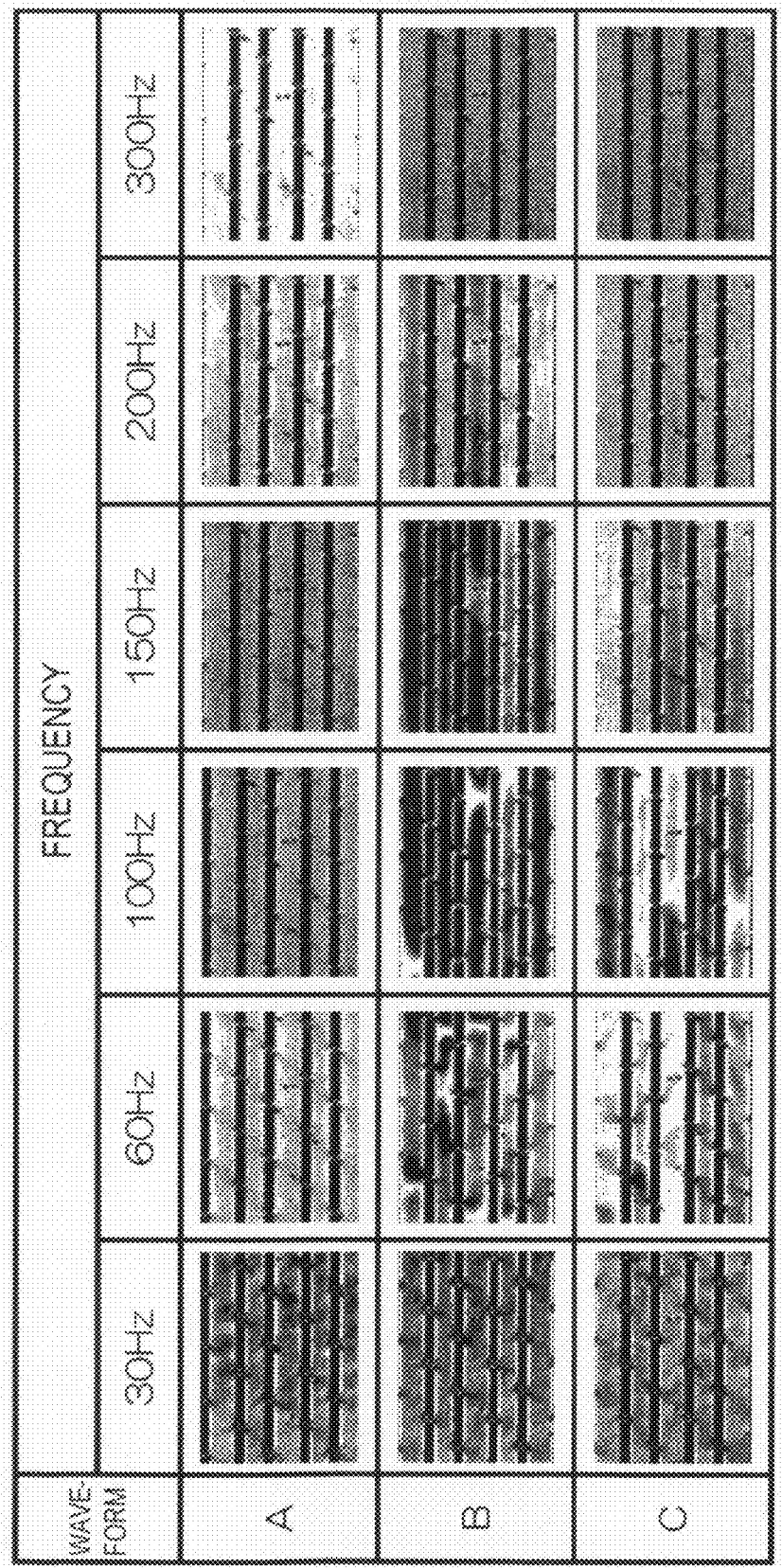
FIG. 8 shows microscopic photographs indicating fourth experiment results.
Figure 9A:
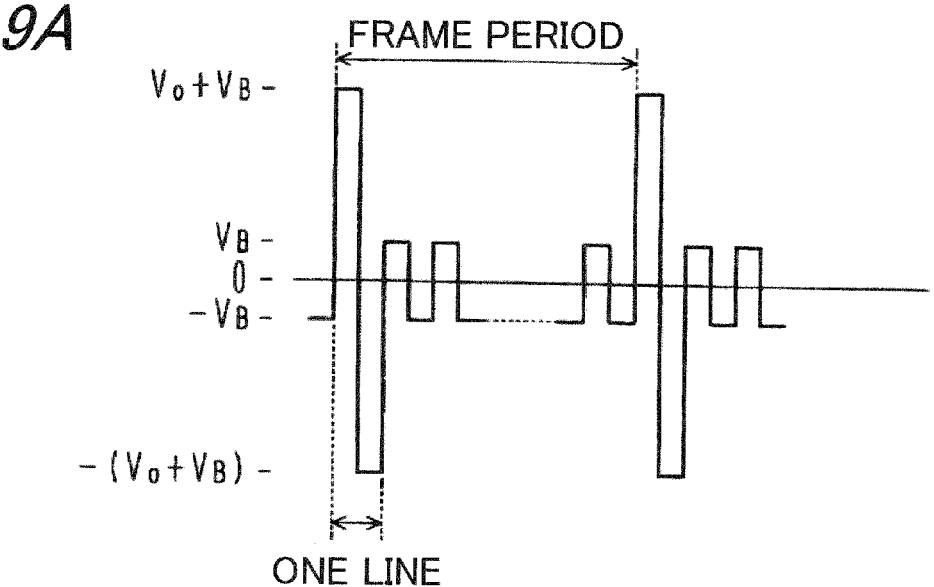
FIGS. 9A to 9C are graphs indicating waveform A, waveform B and waveform C.
Figure 9B:
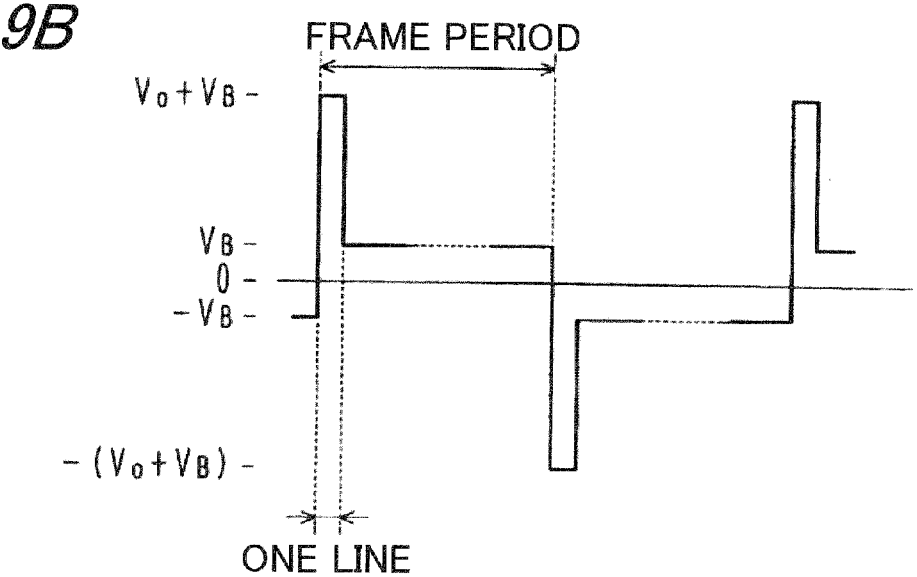
Figure 9C:
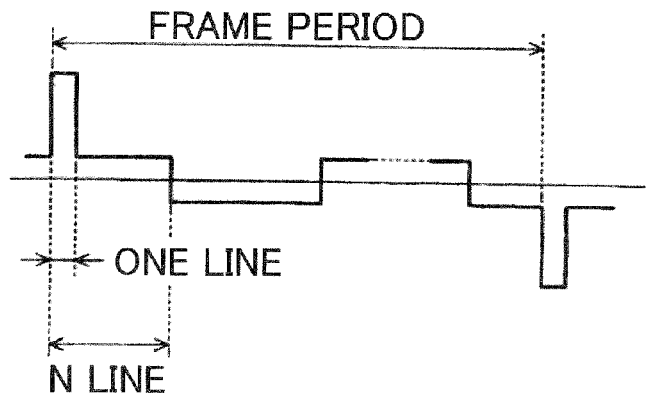
Figure 10A:
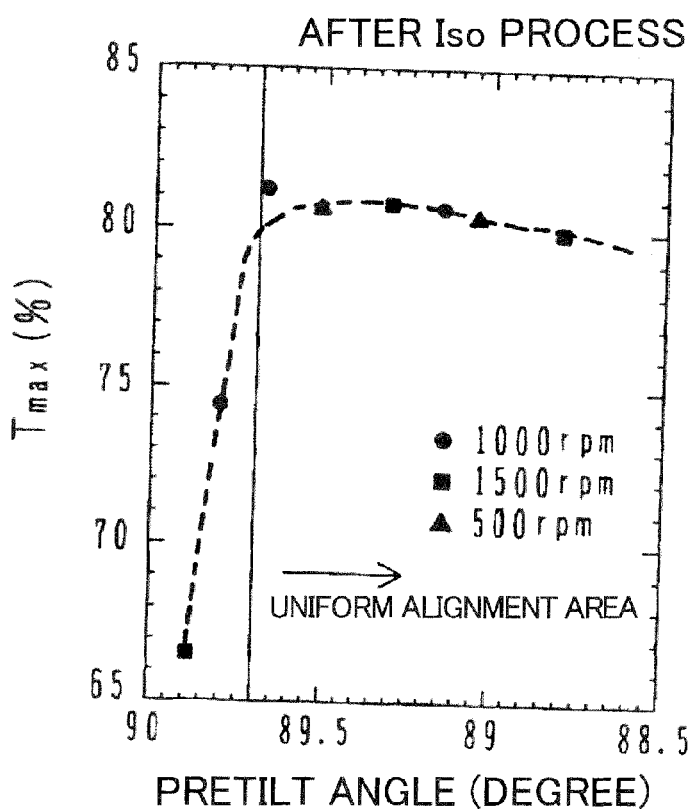
FIG. 10A is a graph showing the relation between a maximum transmissivity Tmax and a pretilt angle.
Figure 10B:
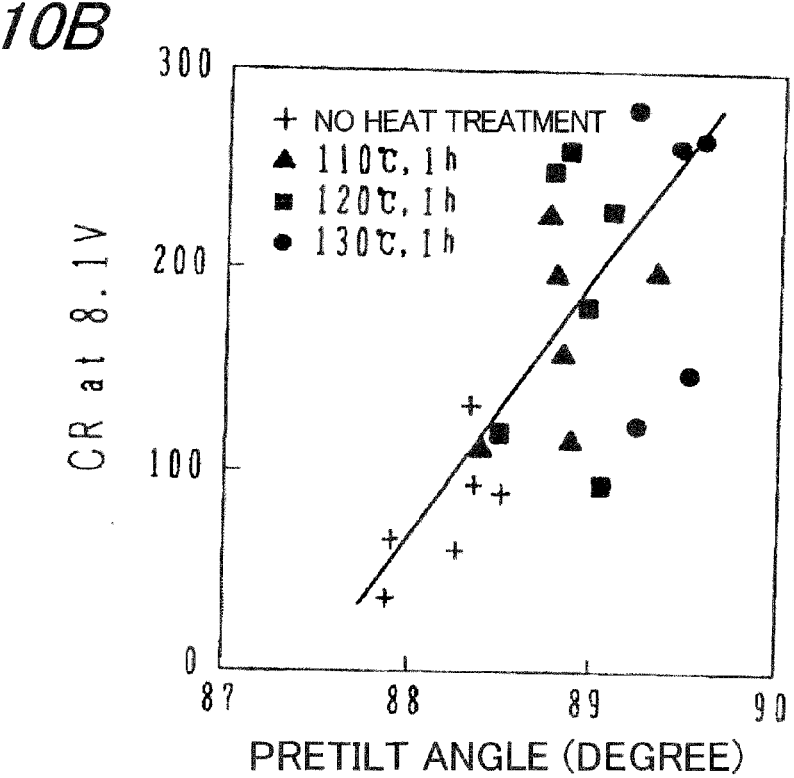
FIG. 10B is a graph showing the relation between a contrast CR and a pretilt angle.
Figure 11:
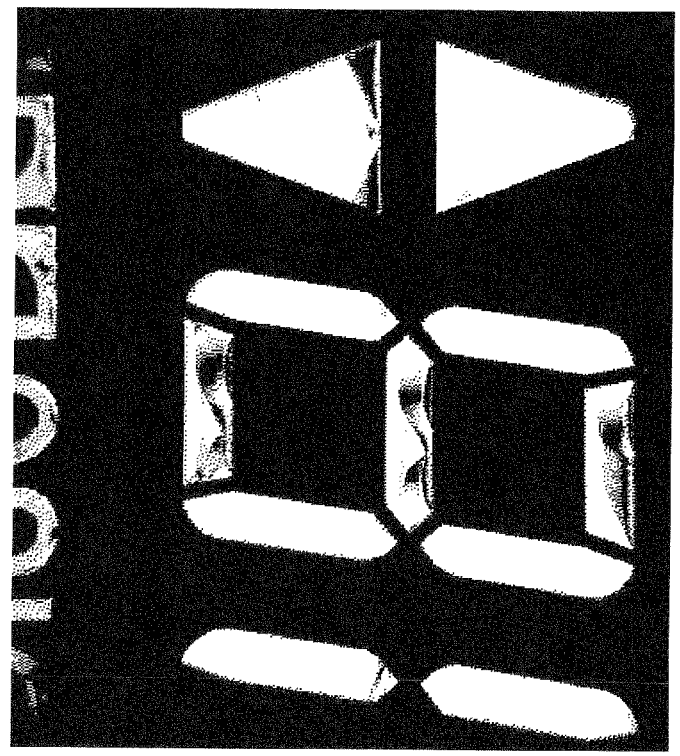
FIG. 11 is a photograph showing an example of a lowered display uniformity of a vertical alignment type liquid crystal display device of a segment display type.
Figure 12:
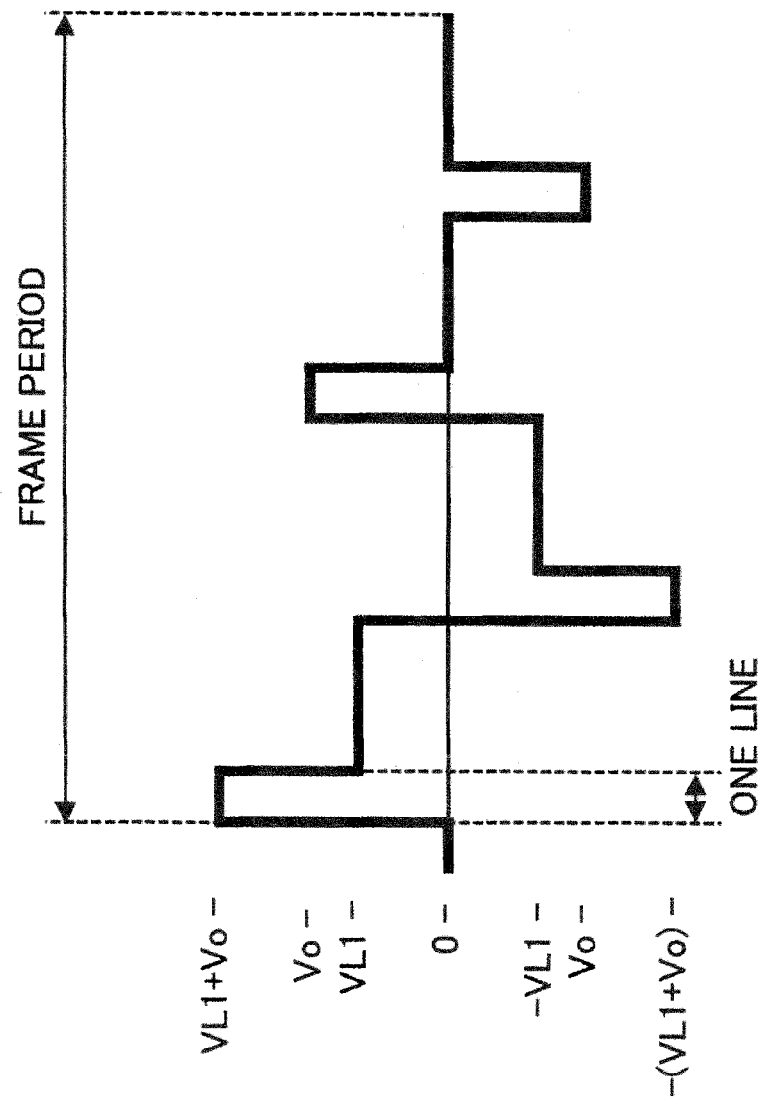
FIG. 12 is a graph indicating waveform MLS.

FIG. 8 shows microscopic photographs as the fourth experiment results. The microscopic photographs are shown in a matrix shape, for each of the frame frequencies and pretilt angles. In the row direction, frame frequencies of 30 Hz, 60 Hz, 100 Hz, 150 Hz, 200 Hz and 300 Hz are juxtaposed in this order from the left side. In the column direction, driving waveforms of waveform A, waveform B and waveform C are juxtaposed in this order from the upper side.

At a frame frequency of 30 Hz, a flowing dark area observed in the first experiments or the like was confirmed for all driving waveforms and it has been found that display uniformity is insufficient.

At a frame frequency of 60 Hz, display uniformity is improved by using waveform A, and the dark area appears only inside the slit openings and between adjacent slit openings in the right-left direction in FIG. 7. It was confirmed visually in this state that there was no problem of display uniformity. Although the flowing dark area was not observed for waveforms B and C, the fixed dark area was observed randomly, and display was not good visually.

It was confirmed from microscopic observation and visual observation that the dark area was completely removed and a uniform display state was obtained by using waveform B at a frame frequency not lower than 300 Hz. Uniform display was able to be realized by using waveform C at a frame frequency not lower than 200 Hz.

As above, it has been found that using waveform A is most effective for display uniformity. It was visually confirmed that uniform display was able to be realized by using waveform MLS (simultaneous select line number N=2) at a frame frequency not lower than 150 Hz.

Similar to the above-described mono domain, the dark area is expected to be suppressed if high frequency components of the driving waveform are large. The above-described condition for the duty of 16 is considered effective also for a higher duty. Further, similar to the mono domain, it is confirmed that the frame frequency dependency is almost the same even at the duty of 4 to 16.

For waveform C, it can be considered from the above-described results that similar to the mono domain, the condition capable of obtaining uniform display is that the polarity reversal line number M is not larger than a half the duty number. It can be considered that the condition capable of obtaining uniform display by waveform B can also obtain uniform display even by waveform C if the polarity reversal line number is not smaller than 1 and not larger than the duty number. For MLS waveform, uniform display can be obtained under the above-described condition even if the simultaneous select line number N is set to 3 or 4.

Also in the multi domain vertical alignment type liquid crystal display apparatus by oblique electric field alignment control, good display can be obtained by selecting a proper frame frequency in accordance with the driving waveform. It is preferable to use waveform A, waveform MLS and waveform C from the view point that display uniformity is realized at a low frame frequency.

As described so far, display uniformity of the mono domain vertical alignment type liquid crystal display apparatus and the multi domain vertical alignment type liquid crystal display apparatus by oblique electric field alignment control can be improved by selecting a proper frame frequency in accordance with the driving waveform.

The liquid crystal display device capable of applying the above-described technologies include, for example, a segment display simple matrix drive liquid crystal display device, a dot matrix display simple matrix drive liquid crystal display device, a liquid crystal display device containing both a segment display simple matrix drive liquid crystal display part and a dot matrix display simple matrix drive liquid crystal display part, and other devices.

The present invention has been described in connection with the preferred embodiments. The invention is not limited only to the above embodiments. It will be apparent to those skilled in the art that other various modifications, improvements, combinations, and the like can be made.

What are claimed are:

1. A liquid crystal display apparatus comprising:
   a liquid crystal cell of a mono domain vertical alignment type; and
   a driver apparatus which applies a multiplex driving waveform to said liquid crystal cell,
   wherein said liquid crystal cell of the mono domain vertical alignment type comprises:
      first and second substrates disposed facing each other;
      a liquid crystal layer sandwiched between said first and second substrates; and
      a first vertical alignment film formed above said first substrate on a side of said liquid crystal layer, and a second vertical alignment film formed below said second substrate on a side of said liquid crystal layer, wherein at least one of said first and second vertical alignment films has an aligning texture which gives liquid crystal molecules in said liquid crystal layer a pretilt angle θp in a range between 88.5° and 89.9° and mono domain alignment during no voltage application;
   wherein said driver apparatus applies, to said liquid crystal cell, a multiplex driving waveform having a frame frequency f, as a function of a duty number and said pretilt angle θp, said duty number being an inverse of a duty ratio; and
   wherein:
      said frame frequency f is not lower than F Hz at a pretilt angle of 88.5° ≤θp <Θ° and not lower than [A1×(θp −Θ)+F] Hz at a pretilt angle of Θ°≤θp≤89.9°, when said duty number is not lower than 4 and not higher than 31,
      said frame frequency f is not lower than F Hz at a pretilt angle of 88.5°≤θp<Θ° and not lower than [A2 ×(θp−Θ)+F] Hz at a pretilt angle of Θ°≤θp≤89.9°, when said duty number is not lower than 32 and not higher than D, and
      said frame frequency f is not lower than F Hz at a pretilt angle of 88.5°≤θp≤89.9°, when said duty number is not lower than (D+1); and
   wherein said frequency F is not lower than 60 Hz, said angle Θ is not higher than 89.6°, said gradient A1 is not lower than 120, said gradient A2 is not lower than 60, and said number D is not lower than 63.

2. The liquid crystal display apparatus according to claim 1, wherein said driving waveform is a multiplex driving waveform with polarity reversal.

3. The liquid crystal display apparatus according to claim 1, wherein said driving waveform is a waveform A, said frequency F is 60 Hz, said angle Θ is 89.6°, said gradient A1 is 120, said gradient A2 is 60, and said number D is 119.

4. The liquid crystal display apparatus according to claim 1, wherein said driving waveform is a waveform B, said frequency F is 100 Hz, said angle Θ is 89.0°, said gradient A1 is 312, said gradient A2 is 160, and said number D is 119.

5. The liquid crystal display apparatus according to claim 1, wherein said driving waveform is a waveform C having a polarity reversal line number M that is not smaller than 1 and not larger than half of said duty number of said waveform C, and
   wherein said frequency F is 60 Hz, said angle Θ is 89.2°, said gradient A1 is 216, said gradient A2 is 110, and said number D is 119.

6. The liquid crystal display apparatus according to claim 1, wherein said driving waveform is a waveform MLS, said frequency F is 60 Hz, said angle Θ is 89.3°, said gradient A1 is 150, said gradient A2 is 75, said number D is 63, a simultaneous line select number N of said waveform MLS is not smaller than 2 and not larger than 4 when said duty number is not higher than 63, and said simultaneous line select number N is 4 when said duty number is not lower than 64.

7. The liquid crystal display apparatus according to claim 1, wherein said first and second vertical alignment films have aligning textures formed by antiparallel rubbing.

\* \* \* \* \*